United States Patent
Collier et al.

(10) Patent No.: US 11,394,543 B2
(45) Date of Patent: Jul. 19, 2022

(54) SYSTEM AND METHOD FOR SECURE SENSITIVE DATA STORAGE AND RECOVERY

(71) Applicant: Coinbase, Inc., San Francisco, CA (US)

(72) Inventors: Paul Collier, San Francisco, CA (US); Alexander Kern, San Francisco, CA (US); Peter Jihoon Kim, San Francisco, CA (US); Sahil Amoli, San Francisco, CA (US); Rohith Varanasi, San Francisco, CA (US); Andrew Gold, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 281 days.

(21) Appl. No.: 16/452,195

(22) Filed: Jun. 25, 2019

(65) Prior Publication Data

US 2020/0195433 A1 Jun. 18, 2020

Related U.S. Application Data

(60) Provisional application No. 62/779,217, filed on Dec. 13, 2018.

(51) Int. Cl.
*H04L 29/06* (2006.01)
*H04L 9/08* (2006.01)
(Continued)

(52) U.S. Cl.
CPC .......... *H04L 9/0894* (2013.01); *H04L 9/0643* (2013.01); *H04L 9/3247* (2013.01); *H04L 2209/38* (2013.01)

(58) Field of Classification Search
CPC . H04L 2209/38; H04L 9/0643; H04L 9/0894; H04L 9/3239; H04L 9/3247;
(Continued)

(56) References Cited

U.S. PATENT DOCUMENTS 2,634,738 A   4/1953  Fuller et al.
5,884,274 A   3/1999  Walker et al.
(Continued)

FOREIGN PATENT DOCUMENTS

EP     2634738 A1    9/2013
JP   2007109002 A    1/2007
(Continued)

OTHER PUBLICATIONS

"Whose bank account is it anyway?", McMillan LLP, Jun. 24, 2011, downloaded from http://www.lexology.com/library/detail.aspx?g20the%20parties.attached as PDF file (Year: 2011).
(Continued)

*Primary Examiner* — Joseph P Hirl
*Assistant Examiner* — Ka Shan Choy
(74) *Attorney, Agent, or Firm* — Perkins Coie LLP

(57) ABSTRACT

A method for managing sensitive data, including: receiving an encryption key from a third party recovery agent; at a user agent executing on a user device, encrypting the sensitive data with the encryption key; and storing the encrypted sensitive data at a third party storage provider system. The method can optionally include, at the user agent: requesting the encryption key from the third party recovery agent using a set of recovery agent authentication credentials; requesting the encrypted sensitive data from the third party storage provider system using a set of storage provider authentication credentials; and decrypting the encrypted sensitive data using the encryption key.

20 Claims, 5 Drawing Sheets

(51) Int. Cl.
*H04L 9/32* (2006.01)
*H04L 9/06* (2006.01)

(58) Field of Classification Search
CPC . H04L 9/3236; H04L 2209/56; G06Q 20/065; G06Q 20/401
See application file for complete search history.

(56) References Cited

U.S. PATENT DOCUMENTS

| | | |
|---|---|---|
| 6,125,186 A | 9/2000 | Saito et al. |
| 6,952,683 B1 | 10/2005 | Gerhard |
| 6,959,394 B1 | 10/2005 | Brickell et al. |
| 7,644,037 B1 | 1/2010 | Ostrovsky |
| 7,689,500 B2 | 3/2010 | Cottrell |
| 7,689,550 B2 | 3/2010 | Lee et al. |
| 7,970,823 B2 | 6/2011 | Moeller et al. |
| 8,055,575 B2 | 11/2011 | Grody et al. |
| 8,111,648 B2 | 2/2012 | Gandham |
| 8,117,648 B2 | 2/2012 | Slaton et al. |
| 8,606,703 B1 | 12/2013 | Dorsey et al. |
| 8,839,386 B2 | 9/2014 | Gilboy |
| 8,855,318 B1 | 10/2014 | Patnala et al. |
| 9,071,429 B1 | 6/2015 | Roth et al. |
| 9,135,787 B1 | 9/2015 | Russell et al. |
| 9,224,262 B2 | 12/2015 | Fine et al. |
| 9,495,668 B1 | 11/2016 | Juels |
| 9,892,460 B1 | 2/2018 | Winklevoss et al. |
| 10,044,509 B1* | 8/2018 | Kirshner ............... H04L 63/045 |
| 10,068,228 B1 | 9/2018 | Winklevoss et al. |
| 10,180,912 B1 | 1/2019 | Franklin et al. |
| 10,256,983 B1 | 4/2019 | Bauer et al. |
| 10,469,309 B1 | 11/2019 | Gupta et al. |
| 10,586,057 B2 | 3/2020 | Keselman et al. |
| 2001/0034605 A1 | 10/2001 | Hoffman |
| 2001/0050990 A1 | 12/2001 | Sudia |
| 2002/0023053 A1 | 2/2002 | Szoc et al. |
| 2002/0116611 A1 | 8/2002 | Zhou et al. |
| 2003/0048906 A1 | 3/2003 | Vora et al. |
| 2005/0010760 A1 | 1/2005 | Goh et al. |
| 2005/0138374 A1 | 6/2005 | Zheng et al. |
| 2006/0168663 A1 | 7/2006 | Viljoen et al. |
| 2007/0223706 A1 | 9/2007 | Rose |
| 2007/0255943 A1* | 11/2007 | Kern ................... H04L 9/0894 713/155 |
| 2008/0091586 A1 | 4/2008 | Cottrell |
| 2008/0263363 A1 | 10/2008 | Jueneman et al. |
| 2009/0037405 A1 | 2/2009 | Lee et al. |
| 2009/0144810 A1 | 6/2009 | Gilboy |
| 2009/0205036 A1 | 8/2009 | Slaton et al. |
| 2009/0254750 A1 | 10/2009 | Bono et al. |
| 2010/0054458 A1 | 3/2010 | Schneider |
| 2010/0175061 A1 | 7/2010 | Maeda et al. |
| 2010/0235588 A1 | 9/2010 | Maeda et al. |
| 2011/0071958 A1 | 3/2011 | Grody et al. |
| 2011/0087582 A1 | 4/2011 | Pak et al. |
| 2011/0106675 A1 | 5/2011 | Perlman |
| 2011/0202755 A1 | 8/2011 | Orsini et al. |
| 2011/0251941 A1 | 10/2011 | Dunwoody |
| 2012/0136782 A1 | 5/2012 | Norman et al. |
| 2012/0150750 A1 | 6/2012 | Law et al. |
| 2012/0239556 A1 | 9/2012 | Magruder et al. |
| 2013/0010966 A1 | 1/2013 | Li et al. |
| 2013/0065670 A1 | 3/2013 | Michaelson et al. |
| 2013/0166455 A1 | 6/2013 | Feigelson |
| 2013/0191632 A1 | 7/2013 | Spector et al. |
| 2013/0246261 A1 | 9/2013 | Purves et al. |
| 2013/0290710 A1 | 10/2013 | Broder et al. |
| 2013/0318347 A1* | 11/2013 | Moffat ................. H04L 9/0894 713/168 |
| 2013/0339738 A1 | 12/2013 | Shaw |
| 2013/0343546 A1 | 12/2013 | Shibutani et al. |
| 2014/0019352 A1 | 1/2014 | Shrivastava |
| 2014/0025473 A1 | 1/2014 | Cohen |
| 2014/0052617 A1 | 2/2014 | Chawla et al. |
| 2014/0057599 A1 | 2/2014 | Hazari |
| 2014/0082749 A1 | 3/2014 | Holland et al. |
| 2014/0093084 A1* | 4/2014 | De Atley ............... G06F 21/64 380/277 |
| 2014/0108223 A1 | 4/2014 | Xiao |
| 2014/0156512 A1 | 6/2014 | Rahman et al. |
| 2014/0172633 A1 | 6/2014 | Dogin et al. |
| 2014/0229739 A1 | 8/2014 | Roth et al. |
| 2014/0274327 A1 | 9/2014 | Fine et al. |
| 2014/0279436 A1 | 9/2014 | Dorsey et al. |
| 2014/0289118 A1 | 9/2014 | Kassemi et al. |
| 2014/0297537 A1 | 10/2014 | Kassemi et al. |
| 2014/0304171 A1 | 10/2014 | Mertens et al. |
| 2015/0033301 A1 | 1/2015 | Pianese et al. |
| 2015/0039444 A1 | 2/2015 | Hardin et al. |
| 2015/0050987 A1 | 2/2015 | Huang et al. |
| 2015/0120569 A1 | 4/2015 | Belshe et al. |
| 2015/0127495 A1 | 5/2015 | Houri |
| 2015/0170112 A1 | 6/2015 | Decastro |
| 2015/0178693 A1 | 6/2015 | Solis |
| 2015/0209678 A1 | 7/2015 | Edwards et al. |
| 2015/0220928 A1 | 8/2015 | Allen |
| 2015/0227897 A1 | 8/2015 | Loera |
| 2015/0228004 A1 | 8/2015 | Bednarek et al. |
| 2015/0262139 A1 | 9/2015 | Shtylman |
| 2015/0262171 A1 | 9/2015 | Langschaedel et al. |
| 2015/0262173 A1 | 9/2015 | Durbin et al. |
| 2015/0287026 A1 | 10/2015 | Yang et al. |
| 2015/0294308 A1 | 10/2015 | Pauker et al. |
| 2015/0302401 A1 | 10/2015 | Metral |
| 2015/0310424 A1 | 10/2015 | Myers |
| 2015/0365283 A1 | 12/2015 | Ronca et al. |
| 2016/0034896 A1 | 2/2016 | O'Brien et al. |
| 2016/0085955 A1 | 3/2016 | Lerner |
| 2016/0086418 A1 | 3/2016 | Smolen et al. |
| 2016/0171570 A1 | 6/2016 | Dogin et al. |
| 2016/0203572 A1 | 7/2016 | McConaghy et al. |
| 2016/0261411 A1 | 9/2016 | Yau et al. |
| 2016/0277398 A1 | 9/2016 | Gregg et al. |
| 2016/0321654 A1 | 11/2016 | Lesavich et al. |
| 2016/0380767 A1 | 12/2016 | Hayashi et al. |
| 2017/0063531 A1 | 3/2017 | Sullivan |
| 2017/0083718 A1 | 3/2017 | Peddada et al. |
| 2017/0161439 A1 | 6/2017 | Raduchel et al. |
| 2018/0024740 A1* | 1/2018 | Miller .................. H04L 49/00 710/5 |
| 2018/0075453 A1* | 3/2018 | Durvasula ........... G06Q 20/389 |
| 2018/0091482 A1* | 3/2018 | Steele .................. G06F 21/60 |
| 2018/0109504 A1* | 4/2018 | Poffenbarger ........ H04L 9/0637 |
| 2018/0191503 A1* | 7/2018 | Alwar .................. H04L 9/0637 |
| 2018/0248704 A1 | 8/2018 | Coode et al. |
| 2018/0367316 A1 | 12/2018 | Cheng et al. |
| 2019/0236245 A1 | 8/2019 | Desarzens et al. |
| 2019/0288840 A1 | 9/2019 | Gallancy et al. |
| 2020/0019685 A1* | 1/2020 | Takahashi ............ H04L 9/0866 |
| 2020/0044833 A1* | 2/2020 | Shpurov ............... H04L 63/06 |
| 2020/0250347 A1* | 8/2020 | Han ...................... H04L 9/0852 |
| 2020/0382277 A1* | 12/2020 | Kong .................... H04L 9/0637 |

FOREIGN PATENT DOCUMENTS

WO 2014190323 A1 11/2014
WO WO-2018127606 A1 * 7/2018 ............ G06F 21/78

OTHER PUBLICATIONS

"What is the coin selection algorithm", downloaded from https://web.archive.org/web/20130228073524/https://bitcoin.stackexchange.com/questions/1077/what-is-the-coin-selection-algorithm dated Feb. 27, 2014.
International Search Report and Written Opinion for PCT Application No. PCT/US2019/027857 dated Jul. 15, 2019.
Ouaddah et al. "FairAccess: a new Blockchain-based access control framework for the 1-20 Internet of Things" In: Security and Communication Networks. Feb. 19, 2017.
Bradbury, Danny , "BitGo Safe Aims to Secure Bitcoin Wallets with Multi-Signature Transactions", CoinDesk, The Voice of Digital

(56) References Cited

OTHER PUBLICATIONS

Currency, http://web.archive.org/web/20140108021304/http://www.coindesk.com/, published Dec. 19, 2013.
"NPL4, Importing Bitcoin from a paper wallet into Electrum", https://thecleverest.com/, dated Mar. 12, 2014.
International Search Report and Written Opinion of the ISA dated Dec. 18, 2019 for PCT/US19/52371.
"blockchainCreate", http://blockchain.info:80/wallet/faq, dated Jan. 9, 2012, (5 pages).
"Off-the-chain transactions", downloaded from http://gavintech.blogspot.com/2012/07/off-chain-transactions.html, dated Jul. 3, 2012 (Year: 2012), (4 pages).
"Securing your wallet", download from https://bitcoin.org/en/secure-yourwallet (post from 2013), (4 pages).
"Wholesale Payment Systems: Interbank Payment and Messaging System, Fedwire and Clearing House Interbank Payment Systems (CHIPS)", https://www.ffiec.gov/ffiecinfobase/booklets/Wholesale/02.html, Dec. 16, 2005, 3 pages)., Feb. 9, 2018 00:00:00.0.
Beal, Alex, "Backing Up Sensitive Data With Secret Sharing", downloaded from https:www.usrsb.in/secret-sharing-backup.html, dated Feb. 23, 2013) (Year: 2013), (8pages).
"Transaction Fees ("Transaction fees and negative balances"", downloaded from https://bitcointalk.org/index.php?topic=6856.0 dated Apr. 30, 2011-May 1, 2011, (Year:2011), (3 pages)., Mar. 1, 2018 00:00:00.0.
ComputerArch (http://www.math.uaa.alaska.edu/-afkjm/cs101/handouts/ComputerArch.pdf attached as pdf, dated Sep. 10, 2009) (Year: 2009).
Dion, Derek A., "I'll gladly trade you two bits on Tuesday for a byte today: Bitcoin, regulating fraud in the e-conomy of Hacker-cash", Journal of Law, Technology & Policy, vol. 2013, 2013, pp. 165-201.
Douget, Joshua J., "The Nature of the Form:Legal and Regulatory issues surrounding the Bitcoin digital currency system", Louisiana Law Review, vol. 73, No. 1 Summer 2013, pp. 1118-1153.
"Blockchain ("How do off chain transactions work?" downloaded from https://bitcoin.stackexchange.com/questions/123530/how-do-off-chain-transactions-work, year 2013."
NIST (Archived NIST Technical Series Publication, dated Jul. 2012, "sp800-57 _part1_rev3_general.pdf", attached as pdf).
Wallace, Benjamin, "The rise and fall of bitcoin", Magazine, WIRED, https://www.wired.com/2011/11/mf_bitcoin/all/1., Nov. 23, 2011, p. 1-17.
"Bitcoin Explained Like You're Five Part 3—Cryptography", http://chrispacia.wordpress.com/2013/09/07/bitcoin-cryptography-digital-signatures-explained/,2013, (21 pages)., Mar. 1, 2018.
"Bitcoin Explained Like You're Five, Part 4—Securing Your Wallet", https://chrispacia.wordpress.com/2013/09/29/bitcoin-explained-like-youre-five-part-4-securing-your-wallet/, dated Sep. 29, 2013) (Year: 2013), (15 pages)., Feb. 9, 2018.
"How Bitcoin Works, downloaded from https://www.forbes.com/sites/investopedia/2013/08/01/how-bitcoin-works/#284bd94a17ff, dated August 1, 2013, attached as PDF file. (Year: 2013)".
Meiklejohn Sarah; et al., "A fistful of bitcoins: Characterizing Payments among men with no names", 2013, (8 pages)., Feb. 9, 2018.
Neuman, Nick, "KeySplit-Tackling the hard parts of being your own bank", https://medium.com/@nickneuman/keysplit-private-key-security-for-cryptocurrency-owners-d1653ea9631d, Feb. 24, 2018.
"GitHub for SelectCoin code", https://github.com/trottier/original-bitcoin/blob/master/src/main.cpp, lines 2410-2510, dated Apr. 4, 2013.
"How do You store a digital backup of your bip39 mnemonic?", https://www.reddit.com/r/Bitcoin/comments/58zst0/how_do_you_store_a_digital_backup_of_your_bip39/, posted by udaggertreatment 4 years ago, May 2017.
Altimore, Pat, et al., "Azure Blockchain Workbench architecture", https://docs.microsoft.com/en-us/azure/blockchain/workbench/architecture#transaction-builder-and-signer, Azure Blockchain, Microsoft Docs, Sep. 5, 2019.
Baldwin, M., et al., "Quickstart: Set and retrieve a secret from Azure Key Vault using the Azure portal", https://docs.microsoft.com/en-us/azure/key-vault/secrets/quick-create-portal, Azure Quickstart, Microsoft Docs, Sep. 3, 2019.
Bauer, Roderick, "Securing Your Cryptocurrency", Backblaze, May 10, 2018.
Kasarabada, Lavanya, "Announcing Storage Service Encryption with customer managed keys general availability", https://azure.microsoft.com/en-us/blog, posted Mar. 7, 2018.
Swanson, William, et al., "A Single-Sign-On Security Platform for Private and Decentralized Applications", https://edge.app/wp-content/uploads/2019/01/Edge-White-Paper-01-22-2019.pdf, Edge, White Paper, Jan. 22, 2019.

* cited by examiner

200

```
┌─────────────────────────────────────────────────────────────┐
│                Generate sensitive data S220                 │
└─────────────────────────────────────────────────────────────┘

┌─────────────────────────────────────────────────────────────┐
│                  Secure the sensitive data S230             │
│  ┌───────────────────────────────────────────────────────┐  │
│  │ Retrieve an encryption key from recovery agent system S231 │  │
│  └───────────────────────────────────────────────────────┘  │
│  ┌───────────────────────────────────────────────────────┐  │
│  │ Encrypt the sensitive data by using the encryption key S232 │  │
│  └───────────────────────────────────────────────────────┘  │
│  ┌───────────────────────────────────────────────────────┐  │
│  │ Store the encrypted sensitive data at a storage provider system S233 │  │
│  └───────────────────────────────────────────────────────┘  │
└─────────────────────────────────────────────────────────────┘

┌─────────────────────────────────────────────────────────────┐
│                   Recover sensitive data S210               │
│  ┌───────────────────────────────────────────────────────┐  │
│  │ Retrieve the encryption key from the recovery agent system S211 │  │
│  └───────────────────────────────────────────────────────┘  │
│  ┌───────────────────────────────────────────────────────┐  │
│  │ Retrieve encrypted data from the storage provider system S212 │  │
│  └───────────────────────────────────────────────────────┘  │
│  ┌───────────────────────────────────────────────────────┐  │
│  │ Decrypt the encrypted data using the encryption key S213 │  │
│  └───────────────────────────────────────────────────────┘  │
└─────────────────────────────────────────────────────────────┘

┌─────────────────────────────────────────────────────────────┐
│                    Delete secured data S240                 │
└─────────────────────────────────────────────────────────────┘

┌─────────────────────────────────────────────────────────────┐
│           Perform a process using the sensitive data S250   │
│  ┌───────────────────────────────────────────────────────┐  │
│  │            Restore a blockchain wallet S251           │  │
│  └───────────────────────────────────────────────────────┘  │
│  ┌───────────────────────────────────────────────────────┐  │
│  │           Sign a blockchain transaction S252          │  │
│  └───────────────────────────────────────────────────────┘  │
└─────────────────────────────────────────────────────────────┘
```

FIGURE 2

SYSTEM AND METHOD FOR SECURE SENSITIVE DATA STORAGE AND RECOVERY

CROSS-REFERENCE TO RELATED APPLICATIONS

This application claims priority to U.S. Provisional Application No. 62/779,217 filed 13 Dec. 2018, which is incorporated herein its entirety by this reference.

TECHNICAL FIELD

This invention relates generally to the computer networking field, and more specifically to a new and useful system and method for storing a sensitive data in network storage and recovering the sensitive data from network storage.

BACKGROUND

There is a need for improved systems and methods for storing and recovering sensitive data. Sensitive data can include any type of data that needs to be secured from access by unauthorized entities. Sensitive data can include, for example, passwords, banking information, healthcare information, secrets, blockchain private keys, cryptocurrency private keys, cryptocurrency wallet mnemonics, and the like.

With respect to cryptocurrency, cryptocurrency wallet applications ordinarily generate keypairs that include a public key and matching private key, store keys, and sign transactions with stored keys. Cryptocurrency wallet applications can also generate transactions to transfer funds from a cryptocurrency address managed by the wallet application to a destination cryptocurrency address. To effect transfer of funds, the cryptocurrency wallet application signs a transaction with a private key that corresponds to a cryptocurrency address that holds the funds. Example wallet applications include hosted wallet applications (e.g., Coinbase.com) and client wallet applications that run on a client device (e.g., a user's mobile device, a user's computer, etc.). Some wallet applications manage several cryptocurrency addresses, and a store a private key for each address. Some wallets, commonly known as hierarchical deterministic (HD) wallets use a single master seed key (commonly referred to as a mnemonic) to derive each cryptocurrency address and corresponding private key. Since an HD wallet application can derive all private keys managed by the HD wallet application from the mnemonic, the entire HD wallet can be backed up (and subsequently recovered) by backing up the mnemonic.

A problem typically encountered with such client wallet applications is how to manage private keys (and mnemonics) in case the associated client device becomes destroyed or lost, or the client wallet application becomes deleted or corrupted. Users typically write down the mnemonic (or private keys) on a piece of paper and store the piece of paper in a safe place. However, unlike with hosted custodial wallet applications (e.g., provided by Coinbase.com), there is no recovery solution for recovering mnemonics (or private keys) written down on paper or encrypted using an encryption key.

Some users encrypt the mnemonic (or private keys) and upload the encrypted data to a cloud storage provider (e.g., Google Drive, iCloud, Dropbox, Box, OneDrive, AWS, etc.). However, while these conventional network storage systems, such as cloud storage providers or key lockers, provide convenience of access to stored data from any device, if security at such systems is compromised, stored data can be accessed by unauthorized users.

Moreover, many users are wary of any recovery solutions that allow a single entity to have access to an un-encrypted version of a mnemonic or private key. Furthermore, if the private key is not stored on a user's device, and the private key must be manually obtained from a piece of paper or manually downloaded and decrypted to sign a cryptocurrency "send" or "withdraw" transaction, usability of such a transaction is impacted.

Thus, there is a need in the key security field to create a new and useful key storage and distribution system and method of use. This invention provides such new and useful system and method of use.

BRIEF DESCRIPTION OF THE FIGURES

FIG. 2 is a flowchart representation of a method, in accordance with embodiments.

DESCRIPTION OF THE PREFERRED EMBODIMENTS

Figure 1:
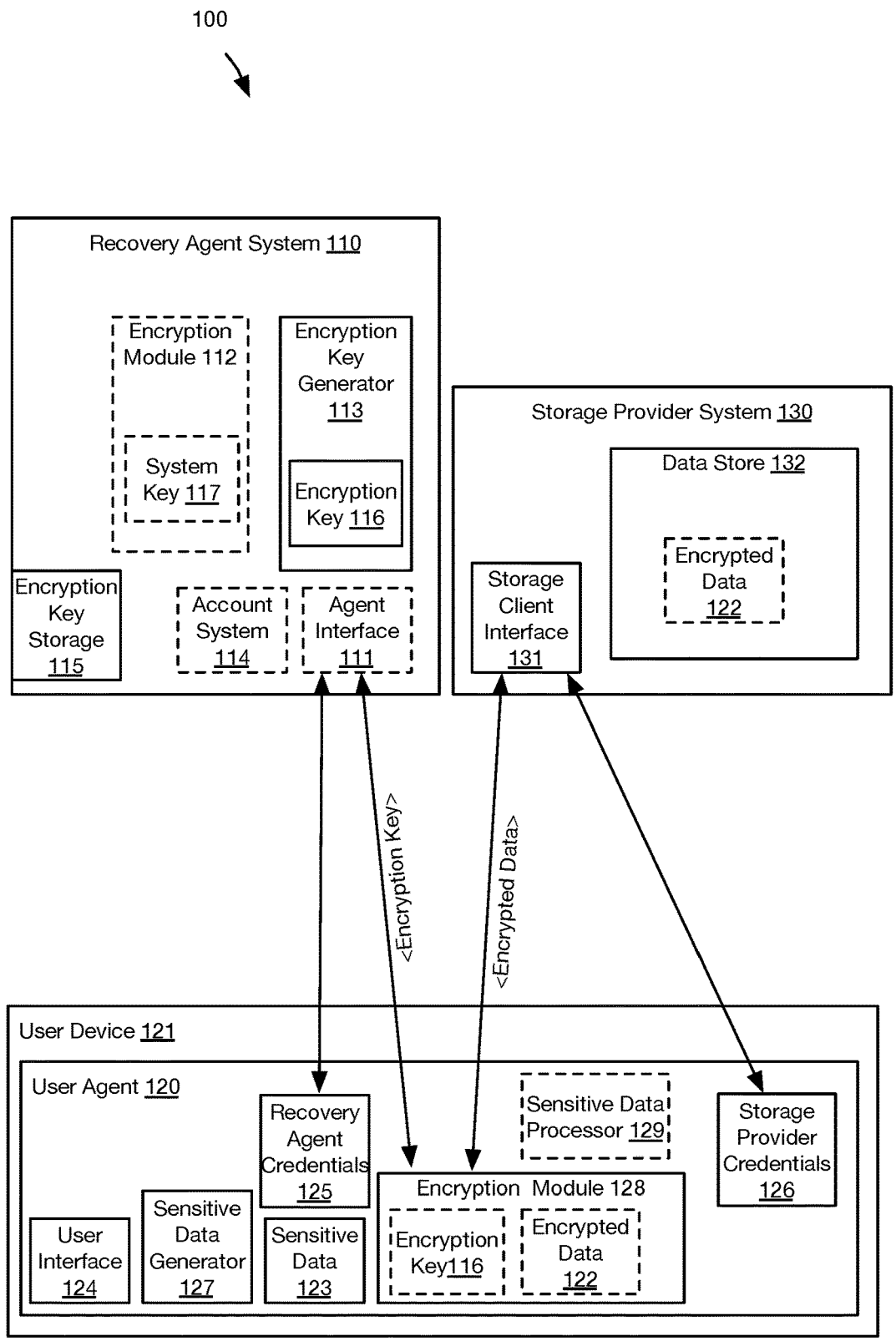
FIG. 1 is a schematic representation of a system, in accordance with embodiments.

The following description of the preferred embodiments of the invention is not intended to limit the invention to these preferred embodiments, but rather to enable any person skilled in the art to make and use this invention.

1. Overview.

The foregoing limitations of existing systems are addressed by embodiments disclosed herein. Embodiments disclosed herein include systems and methods that involve storage and retrieval of sensitive data.

Systems can include one or more of a recovery agent system, a storage provider system, and a user agent (e.g., running on a user device) communicatively coupled to the recovery agent system and the storage provider system via a network (e.g., the Internet).

A method performed by the user agent can include recovering sensitive data by logging in to the storage provider system using storage provider system authentication credentials and logging in to the recovery agent system using recovery agent system authentication credentials. The method can also include one or more of generating the sensitive data with the user agent, and securing the sensitive data by using the service provider system and the recovery agent system.

The user agent can generate the sensitive data, and request an encryption key (from the recovery agent system) to be used by the user agent to encrypt the generated sensitive data. The encrypted sensitive data can then be stored at the service provider system (e.g., by the user agent, using storage provider system authentication credentials). The recovery agent system can generate the encryption key and store the encryption key at the recovery agent system for later retrieval (e.g., during processing of a recovery request received from the user agent). The recovery agent system can optionally encrypt the stored encryption key by using a system encryption key of the recovery agent system.

In this manner, the user agent does not need to manage the encryption key used to encrypt the sensitive data; the user agent can log in to the recovery agent system (using the recovery agent system authentication credentials of the user agent) to access the encryption key. In a case where the user agent (or associated user) loses the recovery agent system authentication credentials, the user agent system can use account recovery features of the recovery agent system to re-gain access to the recovery agent system, and thereby retrieve the encryption key.

Although there are inherent risks in using an encryption key generated by a third party, these risks can be mitigated by embodiments disclosed herein.

Risk of entrusting the recovery agent system with management of the encryption key can be mitigated by generating, encrypting, and storing the sensitive data at a device (e.g., 121) that is separate from (and optionally isolated from) the recovery agent system. In some variations, the device encrypting the sensitive data generates a sensitive data nonce and encrypts the sensitive data by using the sensitive data nonce (e.g., by calling secretbox::seal (msg=M, nonce=CN, k="encryption key"), wherein M is the sensitive data, CN is the sensitive data nonce, and "encryption key" is the encryption key). In some variations, the sensitive data can be encrypted by using any suitable type of encryption process. By restricting access to this sensitive data nonce by the recovery agent system, the recovery agent system can be prevented from decrypting the sensitive data, even if it possesses the encryption key.

Risk of unauthorized access to the encryption key can be mitigated by optionally requiring authentication credentials and multi-factor authentication information for each a backup request (encryption key request) and/or each recovery request received from a user agent.

Risk of unauthorized access to the encryption key can be mitigated by optionally requiring the recovery agent system to provide a new encryption key for each backup request. For example, if a user agent provides a backup request (encryption key request) to the recovery agent system for a new backup of sensitive data, the recovery agent generates a new encryption key. If the user agent provides a second backup request, even for the same backup, the recovery agent sends a new encryption key. In this manner, a malicious system cannot retrieve the encryption key by impersonating the user agent repeating the backup request. Optionally, the recovery agent can limit the number of encryption keys that are generated for each recovery agent account.

Risk of unauthorized access to the encryption key can be mitigated by requiring recovery agent system authentication credentials to receive an encryption key from the recovery agent system.

Risk of unauthorized access to the encryption key can be mitigated by optionally requiring an encryption key ID to receive an encryption key from the recovery agent system. The recovery agent can optionally validate that each encryption key ID provided with a request for the encryption key (recovery request) is associated with the authentication credentials. In this manner, credentials of a first recovery agent account cannot be used to access encryption keys of another recovery agent account. The recovery agent system can provide an encryption key ID to a user agent when the corresponding encryption key is first sent to the user agent (during processing of a backup request). The user agent can store received encryption key IDs at a user device that executes the machine-executable instructions of the user agent. Optionally, the user agent can store a human readable description with a stored encryption key ID, so that a user can identify an encryption key ID for restoring a particular backup of sensitive data. For example, if a user agent requests several encryption keys, the user agent receives an ID for each encryption key, and can store each ID along with a description so that the user of the user agent can identify which ID corresponds to which back up of sensitive data.

Additionally, or alternatively to storing encryption key IDs at the user device, the user agent can store received encryption key IDs (or information generated from an encryption key ID, such as, for example, a hash of the ID, a string that includes the ID, etc.) at the storage provider system. In a first implementation, the user agent stores the IDs at the storage provider system as metadata (in a metadata file or data store). In a second implementation, the user agent generates at least one file name by using the IDs, and stores files having the generated file names at the storage provider system. These files can store the encrypted sensitive data, or be files separate from files that store the encrypted sensitive data.

In a third implementation, the user agent hashes each ID to generate a corresponding hash value, and stores the hash values at the storage provider system. During recovery, the user agent system provides a first recovery request (e.g., GET/encryption_keys/StorageProviderDescription) to the recovery agent system, and receives a list of encryption key IDs for the authentication credentials associated with the first recovery request; and the user agent downloads the hash values (e.g., a list of file names that include the hash values, metadata that includes the hash values, a list of the hash values, files that includes the hash values, etc.) from the storage provider system. The user agent generates hash values for each ID received as a response to the first recovery request, and for each ID whose hash value matches a hash value downloaded from the storage provider system, the user agent provides the ID to the recovery agent system in a second recovery request (e.g., POST encryption_keys/StorageProviderDescription/restore). In a case where the user agent downloads the hash values before downloading the secured sensitive data, the user agent downloads secured sensitive data from the storage provider system that corresponds to the IDs sent to the recovery agent system in the second recovery request.

Risk of unauthorized access to the encryption key can be mitigated by optionally requiring data downloaded from the storage provider system (e.g., filenames, metadata, etc.) to be included with a request (provided to the recovery agent system) for receiving an encryption key from the recovery agent system. In this manner, a malicious system that attempts to access the encryption key will have to compromise the recovery agent system and the storage provider system (or a user agent that stores the data downloaded from the storage provider system). In some implementations, the downloaded data provided to the recovery agent system is a list of one or more file names that match a predetermined string or pattern. In some implementations, the downloaded data provided to the recovery agent system is a list of one or more file names that are identified as being associated with a backup (by metadata stored at the storage provider system).

Risk of loss of the sensitive data can be mitigated by storing the encrypted sensitive data at the storage provider system. Risk of entrusting the storage provider system with the sensitive data can be mitigated by encrypting the sensitive data with the encryption key provided by the recovery agent system. Moreover, access to the sensitive data at the storage provider system can be restricted to entities that have access to the storage provider system authentication credentials. Furthermore, access to the sensitive data at the storage provider system by external systems can be restricted to the user agent (such a device attempting to access the stored data must provide both the storage provider system authentication credentials and credentials for the user agent). In a case where the user agent (or associated user) loses the storage provider system authentication credentials, the user agent system can use account recovery features of the storage provider system to re-gain access to the storage provider system, and thereby retrieve the sensitive data.

2. Benefits.

The systems and methods disclosed herein can confer several benefits over conventional systems.

First, usability in relation to securing (and recovering) sensitive data can be improved. Because the user agent relies on the recovery agent system to generate the encryption key used to encrypt and decrypt the sensitive data, a user of the user agent does not have to remember yet another password (e.g., the encryption key). As long as the user remembers their login credentials for the storage provider system and the recovery agent system, the user device can access the encryption key. If the user forgets one of their login credentials, the user can take advantage of password recovery features of either the storage provider and the recovery agent.

Second, usability in relation to securing (and recovering) information related to blockchain wallets can be improved. While hosted wallets provide password recovery features, they also retain private keys (sensitive data). While client wallets allow user control of their private keys (sensitive data), they do not typically integrate with a hosted system that allows wallet recovery by using recovery agent login credentials and/or storage provider login credentials.

Third, improved security for the sensitive data can be provided by storing the encryption key and the encrypted sensitive data at different systems (e.g., the recovery agent system and the storage provider system). A malicious recovery agent system cannot access the sensitive data without also compromising the storage provider system (e.g., to access the encrypted sensitive data). A malicious storage provider system cannot decrypt the encrypted sensitive data without also compromising the recovery agent system (e.g., to access the encryption key needed to decrypt the encrypted sensitive data).

Fourth, a non-custodial backup system can be provided wherein the user retains control of access to the sensitive data, such that external systems (not operated by the user) are restricted from access to the sensitive data. The user's device (running the user agent) can store the encrypted sensitive data in a cloud storage provider such as Google Drive, iCloud, Dropbox, etc. If the user loses access to their account, the user can authenticate with both their cloud storage provider system and the recovery agent system, access the encryption key, and decrypt the sensitive data. Neither the storage provider system nor the recovery agent system can unilaterally access the sensitive data. The only location the unencrypted sensitive data is ever known is on the user device (running the user agent).

Fifth, multi-device sensitive data transport is provided by enabling backup of the sensitive data with the user agent at a first device (using the recovery and storage authentication credentials), and recovery of the sensitive data with the user agent at a second device (using the recovery and storage authentication credentials).

Sixth, multi-user sensitive data transport is provided by enabling backup of the sensitive data with the user agent at a first device (using the recovery and storage authentication credentials of a first user associated with a recovery agent account), and recovery of the sensitive data with the user agent at a second device (using recovery and storage authentication credentials of a second user associated with the recovery agent account).

3. System.

The system 100 shown in FIG. 1 functions to store and retrieve sensitive data. Sensitive data can include, for example, passwords, banking information, healthcare information, secrets, blockchain private keys, cryptocurrency private keys, cryptocurrency wallet mnemonics, and the like. As shown in FIG. 1, the system (e.g., 100) includes: a recovery agent system (e.g., 110), a user agent (e.g., 120), and a storage provider system (e.g., 130).

The recovery agent system 110 functions to generate, store, and transmit encryption keys (e.g., 116) that can be used by the user agent to encrypt sensitive data. The recovery agent system 110 is separate from the storage provider system and requires credentials that are different from the credentials used to access the storage provider system. The recovery agent system can be a stand-alone recovery agent system. Alternatively, the recovery agent system can be included as a component of a larger system. In some variations, the recovery agent system 110 is included in a cryptocurrency management system. In some variations, the recovery agent system 110 is included in a cryptocurrency payment system. In some variations, the recovery agent system 110 is included in a cryptocurrency merchant (or commerce) system. In some variations, the recovery agent system 110 is included in a blockchain client system. The recovery agent system can include at least one of an agent interface 111, an encryption module 112, an encryption key generator 113, an account system 114, and an encryption key storage 115.

The agent interface iii functions to authenticate requests (by using authentication credentials, e.g., 125) received from user agents (e.g., 120), process authenticated requests, and provide corresponding responses. The agent interface iii can include an application programming interface (API), such as, for example, a REST API.

The account system 114 functions to register new accounts for the recovery agent system 110 and store corresponding account information for registered accounts, and validate authentication credentials received by the agent interface 111 in connection with requests received by the agent interface 111. The account system 114 also functions to perform an account recovery process for a user agent in a case where the user agent does not have recovery agent authentication credentials.

The encryption key generator 113 functions to generate encryption keys (e.g., 116) to be used by user agents (e.g., 120). In some variations, the encryption key generator is a random number generator.

The encryption module 112 functions to encrypt encryption keys (e.g., 116) generated by the encryption key generator 113 by using a system encryption key 117 (and optionally a nonce generated for the key to be encrypted). In some variations, the encryption module 112 uses a master encryption key to encrypt keys generated for all accounts managed by the account system 114. In some variations, the encryption module 112 includes a master encryption key for each account managed by the account system 114, and uses a master encryption key for an account to encrypt keys generated for the account. In come variations, the encryption module 112 generates a nonce (N) for each encryption process performed by the encryption key module, and stores the nonce in the encryption key storage 115 in association with ciphertext generated by the encryption process. In some implementations, the encryption key module 112 is the NaCL Cryptography Library, and the encryption key module 112 encrypts keys ("encryption key to be encrypted") generated by the generator 113 by calling secretbox::seal (msg="key generated by generator 113", nonce=N, k="system key 117"), which generates a ciphertext version (C) of the key generated by the generator 113. In some implementations, the key can be encrypted by using any suitable type of encryption process.

In some implementations, the encryption key storage 115 functions to store keys generated by the encryption key generator 113. In some implementations, the encryption key storage 115 functions to store ciphertext versions of keys (C) encrypted by the encryption module 112. In some implementations, the encryption key storage 115 functions to store keys encrypted by the encryption module 112 (ciphertext keys) (C) in association with a nonce (N) used to encrypt the key. In some implementations, for each encrypted key (C), the encryption key storage 115 generates an encryption key ID, and maps the encryption key ID to the encrypted key (ciphertext key) and the nonce (N) used to encrypt the key, such that the recovery agent system can retrieve the encrypted key and the nonce from the encryption key storage 115 by using the encryption key ID. In some variations, the recovery agent system 110 provides the encryption key ID (and the associated cleartext encryption key) to a corresponding user agent.

Figure 5A:
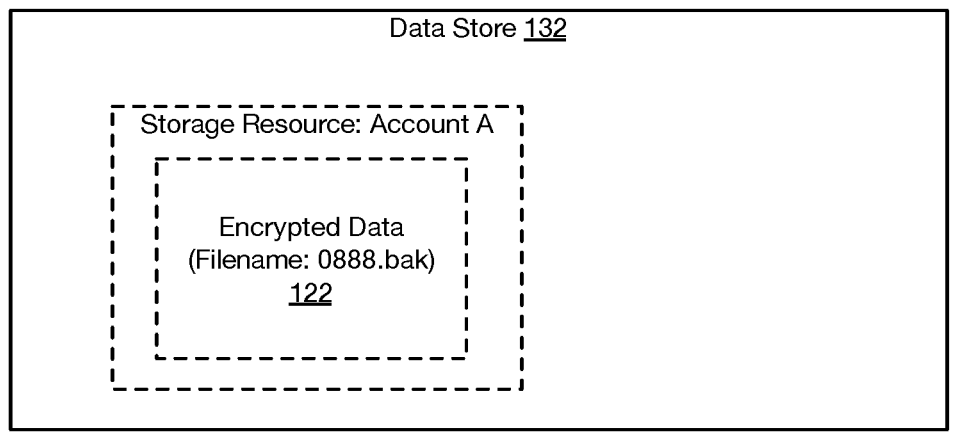
FIGS. 5A and 5B are schematic representations of a data store, in accordance with embodiments.
Figure 5B:
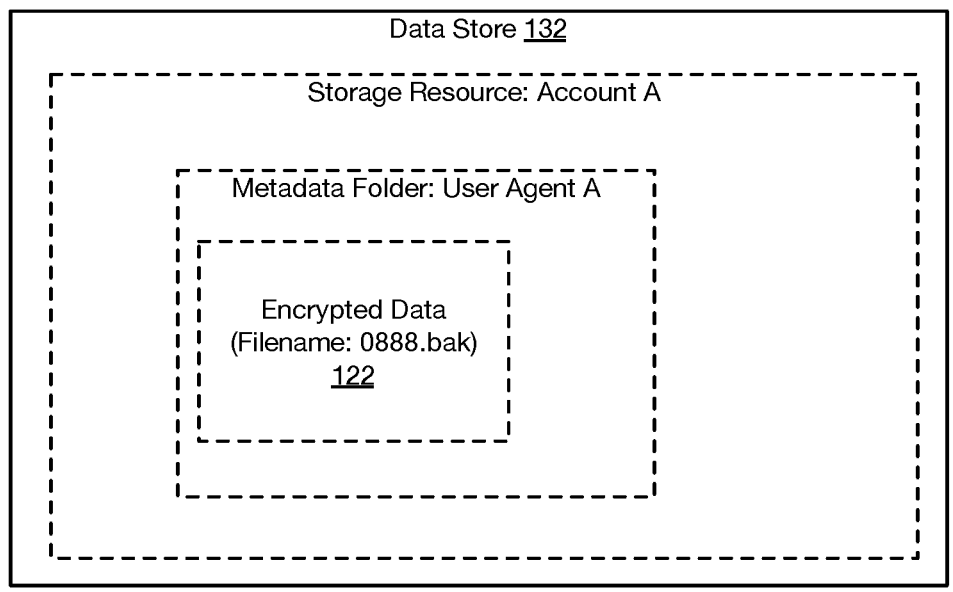

The storage provider system 130 functions to store encrypted sensitive data (e.g., a backup bundle) received from the user agent, and transmit stored data to the user agent. Example storage provider systems includes Google Drive, iCloud, Amazon Web Services, OneDrive, Box, Dropbox, and the like. The storage provider system can include at least one of a client interface 131 and a data store 132. The client interface 131 functions to authenticate requests (by using authentication credentials, e.g., 126) received from user agents (e.g., 120), process authenticated requests, and provide corresponding responses. The client interface 131 can include an application programming interface (API), such as, for example, a REST API. The data store 132 functions to store data (e.g., the encrypted data 122) in a storage resource accessible to an application that establishes an authenticated communication session with the client interface 131. FIGS. 5A and 5B depict storage of encrypted data (e.g., 122), in accordance with embodiments. In some variations, the data store 132 functions to store data (e.g., the encrypted data 122) in a storage resource such that the data is secured with authentication credentials of the user agent application. In some implementations, the data store 132 functions to store the data in a metadata folder (e.g., as shown in FIG. 5B). In some implementations, the data store 132 functions to store the data in an Application Data folder (e.g., a Google Drive App Folder). In some variations, storing data in a metadata folder (or Application Data folder) limits access to the data such that only the application (e.g., the user agent 120) that added that data to the metadata folder (or Application Data folder) can access or delete the stored data. In other words, other applications that are also using the storage provider system using the same storage provider credentials cannot access the data stored in the metadata folder (or Application Data folder).

The user agent 120 functions to encrypt sensitive data (e.g., 123) by using an encryption key (e.g., 116) received from the recovery agent system (S231, S232), and store the encrypted data (e.g., 122) at the storage provider system 130 (S233). The user agent 120 can also function to retrieve the encrypted data (e.g., 122) from the storage provider system, and decrypt the encrypted data (S212, S213). In some implementations, the user agent 120 decrypts the data by using the encryption key used to encrypt the data (symmetric encryption key). In other implementations, the user agent 120 decrypts the data by using a decryption key of a keypair that includes the encryption key used to encrypt the data. In some embodiments, the user agent functions to perform at least a portion of S220, S230, S240, and S250. In some variations, the user agent is a client application for a cryptocurrency management system. In some variations, the user agent is a client application for a cryptocurrency payment system. In some variations, the user agent is a client application for a cryptocurrency merchant (or commerce) system. In some variations, the user agent is a client application for a blockchain client system.

The user agent 120 can include at least one of a user interface 124, a sensitive data generator 127, the sensitive data 124, recovery agent credentials 125, storage provider credentials 126, an encryption module 128, and a sensitive data processor 129.

In some variations, the user agent is an application executed by a processor of a user device (e.g., 121). In some variations, data generated by the user agent 120 is stored in volatile memory and is restricted from being stored in non-volatile storage or a cache. In other variations, data generated by the user agent 120 is stored in non-volatile storage. In a first implementation, the user agent is client-side script running in a browser. In a second implementation, the user agent is browser plug-in. In a third implementation, the user agent is native application running on an operating system of the associated user device (e.g., iOS, Android, Windows, macOS, Linux).

In some client-side script implementations, the user agent runs within a sandboxed browser iframe. In some client-side script implementations, the user agent iframe includes a nested sandboxed browser iframe that includes a client-side script (e.g., a google drive client) that functions to communicate with the storage client interface 131. In some implementations, the user agent iframe includes a client-side script that functions to communicate with the agent interface 111. In some implementations, subsequent to establishment of a communication session between the user agent 120 and the recovery agent system 110 by using the recovery agent authentication credentials 125, the user device 120 receives a recovery session cookie (auth token) from the recovery agent system 110 and stores the recovery session cookie for use in subsequent communications with the recovery agent system. In some implementations, subsequent to establishment of a communication session between the user agent 120 and the storage provider system 130 by using the storage provider authentication credentials 126, the user device 120 receives a storage session cookie (auth token) from the storage provider system 130 and stores the storage session cookie for use in subsequent communications with the storage provider system.

The user interface 124 functions to receive user input from a user of the user device 121, and display information to the user. The user interface 124 can function to receive one or both of the recovery agent authentication credentials 125 and the storage provider authentication credentials 126 from the user of the device 121. In some variations, the user interface 124 can function to receive the sensitive data 123 from the user of the device 121.

In some embodiments, the sensitive data generator 127 functions to generate the sensitive data (S220). In a first variation, the sensitive data generator functions to generate a private key used to sign blockchain transactions. In a second variation, the sensitive data generator functions to generate a mnemonic (passphrase) used to generate a private key for signing blockchain transactions.

In some embodiments, the sensitive data processor 129 functions to perform a process by using unencrypted sensitive data (e.g., 123) (S250). In some variations, the sensitive data processor 129 functions to sign blockchain transactions by using unencrypted sensitive data (e.g., 123) (S252). In some variations, the sensitive data processor 129 functions to perform at least one of generating blockchain transactions, broadcasting blockchain transactions to a blockchain network, and receiving blockchain information from a blockchain network.

In some embodiments, the encryption module 128 functions to perform a secure backup by encrypting sensitive data (e.g., 123) generated (or received) by the user agent by using an encryption key (e.g., 116) generated by and received from the recovery agent system 110 to generate an encrypted version (e.g., 122) of the data (S232). In some embodiments, the encryption module 128 also functions to store the encrypted data (e.g., 122) at the storage provider system 130 (S233).

In some embodiments, the encryption module 128 also functions to restore a secure backup by decrypting encrypted sensitive data (e.g., 122) received from the storage provider system 130 by using an encryption key (e.g., 116) received from the recovery agent system 110 to generate an a cleartext version (e.g., 123) of the data (S210). In some variations, the encryption module 128 also functions to provide the cleartext data (e.g., 123) to the sensitive data processor 129.

4. Method.

FIG. 2 is a flowchart representation of a method 200. In some variations, the method 200 is performed by at least one component (e.g., the user agent 120) of the system 100. In some variations, the method is performed by a user agent application executed by a user device. In other variations, the method is performed by a user agent application (e.g., 120) executed by a user device (e.g., 121) and a recovery agent system (e.g., 130).

Figure 4:
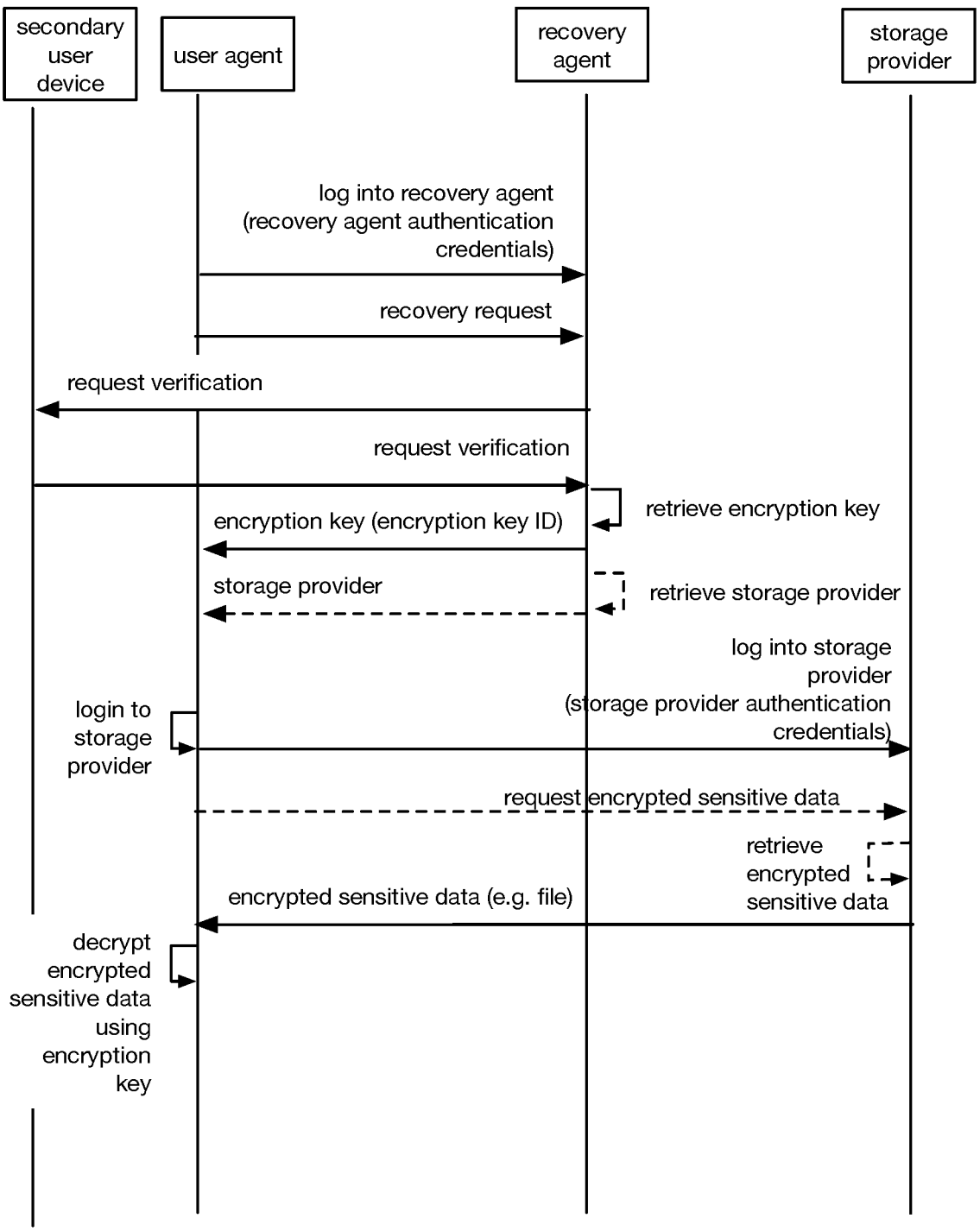
FIG. 4 is a schematic representation of an example of the recovery method.

The method 200 includes recovering sensitive data (e.g., 123 shown in FIG. 1; example shown in FIG. 4) at a user device (e.g., 121) S210. The method 200 can optionally include one or more of: generating the sensitive data (S220); securing the sensitive data (S230); deleting secured sensitive data (S240); and performing a process by using the sensitive data S250. In some variations, S220 and S230 are performed by a first user agent, and S210 is performed by a second user agent. In some variations, S220 and S230 are performed by a user agent running on first user device, and S210 is performed by a user agent running on a second user device.

S210 functions to recover sensitive data (at the user device, e.g., 121) by using a storage provider system authentication credentials (e.g., 126 shown in FIG. 1) and recovery agent system authentication credentials (e.g., 125 shown in FIG. 1).

S210 can include: retrieving a stored encryption key (e.g., 116) from a recovery agent system (e.g., 110) S211; retrieving encrypted sensitive data (e.g., 122) from a storage provider system (e.g., 130) S212; and decrypting the encrypted sensitive data by using the retrieved encryption key S213.

Figure 3:
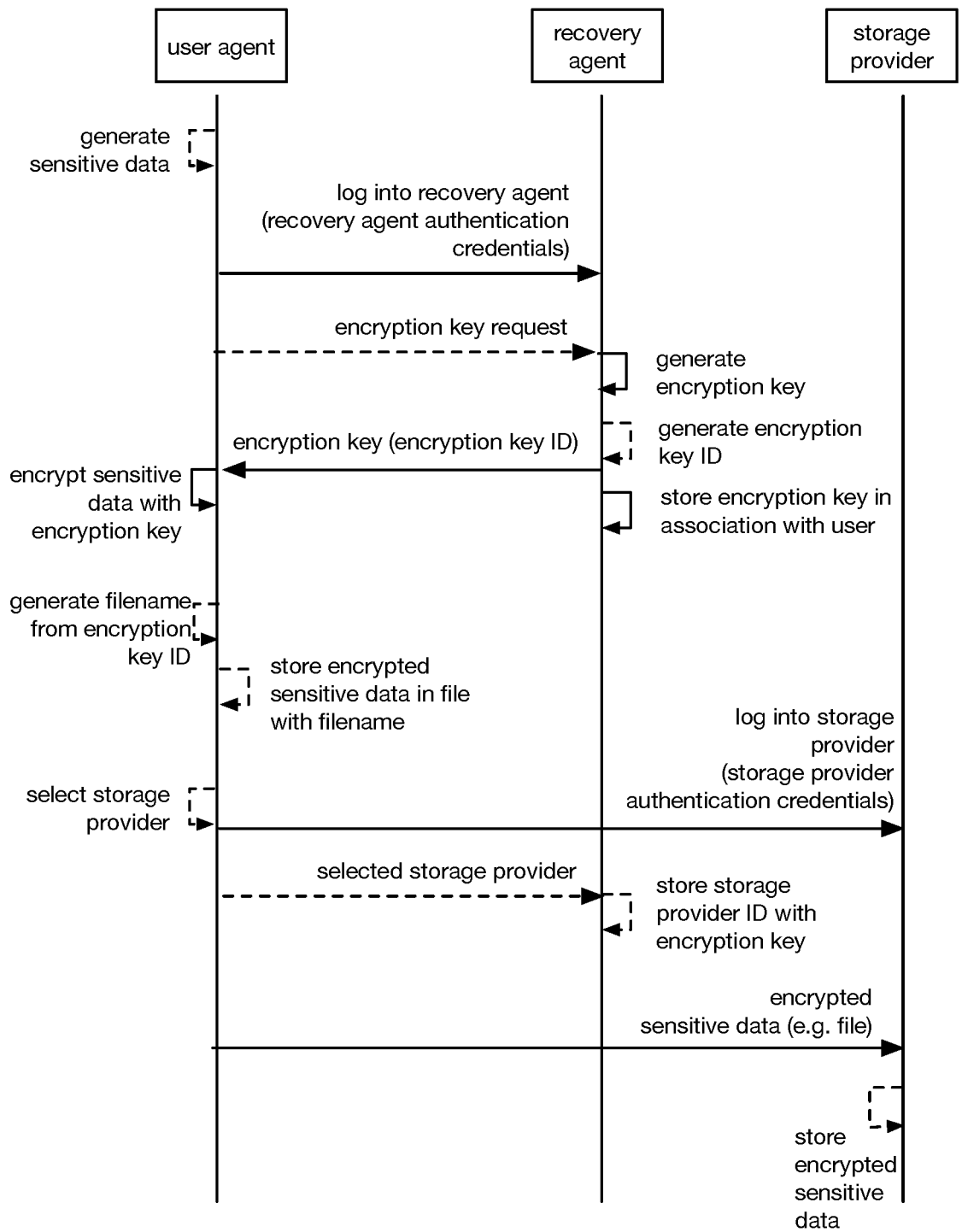
FIG. 3 is a schematic representation of an example of the backup method.

S211 functions to retrieve an encryption key that was previously generated (during processing of a backup request) and stored by the recovery agent system. The encryption key is received by the user agent as a response to a recovery request provided by the user agent to the recovery agent system (example shown in FIG. 3). In some variations, the user agent retrieves the encryption key from the recovery agent system by providing a recovery request to the recovery agent system.

In some variations, the user agent provides at least one of the following with each recovery request: authentication credentials (e.g., 125), an authentication token for an established communication session with the recovery agent system, and multi-factor authentication (2fa) information (e.g., information generated by an authenticator application, information received via an out-of-band communication, such as a text message or phone call, etc.).

The recovery agent system authentication credentials (e.g., 125) can include a (username, password) combination or an authentication token (e.g., stored as a cookie). In some variations, after establishment of a communication session (successful login) between the user agent (e.g., 120) and the recovery agent system (e.g., 130), the recovery agent system provides the user agent with an authentication token (e.g., a cookie) to be used for at least some types of subsequent communications, and the user agent stores the authentication token (e.g., at the user device 121 that executes the user agent). In some variations, S210 includes the user agent establishing a communication session with the recovery agent system via a public network (e.g., the Internet). S211 can include the user agent establishing a communication session with the recovery agent system by using at least one of the recovery agent system authentication credentials (e.g., 125) and multi-factor authentication (2fa) information (e.g., information generated by an authenticator application, information received via an out-of-band communication, such as a text message or phone call, etc.).

The method 200 can include validating the recovery request by using the recovery agent system. In some implementations, the recovery agent system validates the recovery request by validating the authentication credentials provided with the request with account information stored in the account system 114. In some implementations, the recovery agent system validates the recovery request by matching an IP address associated with the request with account information stored in the account system 114. In some implementations, the recovery agent system validates the recovery request by using multi-factor authentication information provided with the request by using a multi-factor authentication system (e.g., sending an inquiry to a second user device, associated with the user account, to verify that the recovery request was requested by the user). The method 200 can include processing the recovery request by using the recovery agent system.

The recovery request provided at S211 can identify at least one of a recovery account managed by the account database 114, a storage provider system (e.g., 130), an encryption key ID, data downloaded from the storage provider system (e.g., filenames, metadata, etc.), a file name, and information extracted from a file name.

In a first variation, S211 includes the user agent providing a recovery request that identifies data downloaded from the storage provider system (e.g., filenames, metadata, etc.) that does not include the encrypted data (but rather related metadata), and the recovery agent system accesses at least one encryption key based on the data downloaded form the storage provider system. In a second variation, S211 includes the user agent providing a recovery request that identifies at least one encryption key ID. In the second variation of S211, the recovery agent can optionally validate that each encryption key ID provided with a request for the encryption key (recovery request) is associated with the authentication credentials provided with the recovery request. In a first implementation, at S211, the user agent retrieves encryption key IDs from a storage device of a user device (e.g., 121) that runs the user agent. In some variations, the user agent stores each encryption key ID during securing of the sensitive data (at S231) at a storage device of the user device running the user agent. In some examples, each encryption key ID stored by the user device is stored in association with a data identifier that identifies the sensitive data encrypted with the encryption key identified by the encryption key ID. In some examples, the user agent receives the data identifier via the user interface 124. In some examples, the user agent selects one or more encryption key ID's (stored at the user device) based on user selection of a data identifier received via the user interface 124, and the recovery request identifies each selected encryption key ID. In some examples, the user agent generates the recovery request to identify each encryption key ID stored at the user device that runs the user agent.

In a second implementation, (at one or more of S211 and S212) the user agent downloads data (e.g., backup information) from the storage provider system (e.g., filenames, metadata, etc.), and the downloaded data includes the encryption key IDs. The user agent extracts the encryption key IDs from the downloaded data and includes them in the recovery request. In some variations, downloaded data is a file name. In some examples, the user agent extracts the encryption key IDs from a downloaded file name. In some examples, the user agent extracts the encryption key IDs from a downloaded file. In some examples, the user agent downloads the data from the storage provider system by establishing a communication session (logging in) with the storage provider system (e.g., 130) by using the storage provider authentication credentials (e.g., 126) (or communicating with the storage provider system via an established communication session by using an authentication token for the session), and retrieving backup information stored at the storage provider system in association with an account that is associated with the storage provider authentication credentials. In some examples, the user agent also provides the storage provider system with authentication credentials for the user agent, and the backup information includes information stored at the storage provider system in association with the authentication credentials for the user agent and the storage provider authentication credentials (e.g., information stored in a location that is restricted to access by the user agent among other processes running on the user device). The backup information can include at least one of the encryption key IDs, information used to generate the encryption key IDs, metadata, a list of file names, encrypted data (e.g., 122). In a first example, the backup information includes a list of file names associated with encryption key IDs. In some implementations, these files include the encrypted data (e.g., 122). For example, the file name of the encrypted data can identify an encrypted key ID. In some examples, these files do not store encrypted data, but are stored in association with the encrypted data at the storage provider system. For example, a secondary file can identify the encryption key ID and the file name for the encrypted data.

In a third implementation, at S211, the user agent system provides a first recovery request to the recovery agent system, and receives a first list of encryption key IDs associated with the authentication credentials associated with the first recovery request; and (at one or more of S211 and S212) the user agent downloads data (backup information) (e.g., a list of file names that include the hash values, metadata that includes the hash values, a list of the hash values, files that includes the hash values, etc.) from the storage provider system. After retrieving the backup information, the user agent determines whether any of the IDs of the first list are included in the retrieved backup information. The user agent selects every encryption key ID that is included in the retrieved backup information, the user generates a second recovery request that includes the selected encryption key IDs, and the user agent sends the second recovery request to the recovery agent system.

In a fourth implementation, at S211, the user agent system provides a first recovery request to the recovery agent system, and receives a first list of encryption key IDs associated with the authentication credentials associated with the first recovery request; and (at one or more of S211 and S212) the user agent downloads hash values (e.g., a list of file names that include the hash values, metadata that includes the hash values, a list of the hash values, files that includes the hash values, etc.) from the storage provider system. The user agent generates hash values for each ID provided as a response to the first recovery request, and for each ID whose hash value matches a hash value downloaded from the storage provider system, the user agent provides the ID to the recovery agent system in a second recovery request.

In some implementations, the user agent provides each second recovery request to the recovery agent system with at least one of: authentication credentials (e.g., 125), an authentication token for an established communication session with the recovery agent system, and multi-factor authentication (2fa) information (e.g., information generated by an authenticator application, information received via an out-of-band communication, such as a text message or phone call, etc.) and the recovery agent system validates the second recovery request by using the information provided with the recovery request (or in connection with the recovery request, e.g., multi-factor auth or out-of-band authentication information).

In a case where the user agent downloads the hash values or encryption IDs before downloading the secured sensitive data, the user agent downloads secured sensitive data from the storage provider system that matches the IDs sent to the recovery agent system in the second recovery request at S212. In some implementations, the downloaded hash values are included in metadata (or filename listings) related to the encrypted data, and subsequent to selecting the encryption key IDs, the user agent downloads files having filenames that include the selected encryption key IDs (or hashes of the selected encryption key IDs) at S212.

At S211, the recovery agent system retrieves the encryption key from the encryption key storage 115. In some implementations of S211, the encryption keys are retrieved based on recovery account: the recovery request identifies a recovery account, and retrieving the encryption key from the encryption key storage 115 includes retrieving at least one encryption key associated with the recovery account.

In implementations in which the recovery request provides encryption key IDs, retrieving the encryption key from the encryption key storage 115 includes retrieving at least one encryption key associated with each encryption key ID provided with the recovery request. With respect to using encryption key IDs, in some implementations, the recovery agent system validates that each encryption key ID is associated with a recovery account identified by the recovery request (as indicated by the account system 114), and retrieves the encryption keys responsive to successful validation.

In some variations, the encryption key is stored in the encryption key storage 115 in an unencrypted (cleartext) format. In some variations, the encryption key is stored in the encryption key storage 115 in an encrypted (ciphertext) format, and S211 includes decrypting the encrypted encryption key (with the recovery agent system) by using the system key 117. In some variations, the encryption module 112 performs the decryption. In some implementations, the recovery agent system decrypts the encrypted encryption key (C) by using the system key 117 and a nonce (N) associated with the encryption key (and generated by the recovery agent system). In some implementations, the encryption key module 112 is the NaCL Cryptography Library, and the encryption key module 112 decrypts the encrypted encryption key by calling an open method (e.g., secretbox::open(msg=C, nonce=N, k="system key 117")). In some implementations, the key can be decrypted by using any suitable type of encryption process.

In some implementations, the nonce (N) is stored in association with an account identifier, and the recovery agent system retrieves the nonce by using an account identifier associated with the associated recovery request. In some implementations, the nonce is stored in association with an encryption key ID being used to retrieve the encryption key, and the recovery agent system retrieves the nonce by using the encryption key ID.

In some implementations, the system key 117 is used for all accounts managed by the account system 114. In some implementations, the encryption module 112 manages a system key for each account (or at least a subset of accounts) managed by the account system 114.

S211 includes the recovery agent system providing the cleartext encryption key (e.g., 116) to the user agent (e.g., 120), and the user agent receiving the cleartext encryption key (e.g., 116). Additionally or alternatively, the encryption key can be encrypted using a keypair shared between the user agent and the recovery agent system.

S211 can include the recovery agent system providing to the user agent (e.g., 120) information identifying a storage provider system (e.g., 130) that is associated with the encryption key provided by the recovery agent system (as a response to a recovery request), and the user agent receiving the information identifying the storage provider. In some implementations, the user agent provides the recovery agent system with the information identifying the storage provider system while requesting the recovery agent system to generate the encryption key (e.g., at S231). Additionally or alternatively, the storage provider system information associated with the encryption key (and/or encrypted data) can be stored by the user agent; received from the user (e.g., wherein the user remembers which storage provider was used); or otherwise identified.

In some variations, S211 is performed by the encryption module 128.

In some variations, S212 includes (with a user agent) retrieving all files associated with the provided authentication credentials (and optionally the user agent credentials). In some variations, S212 includes retrieving selected ones of the files (as determined based on user selection received via the user interface 124). In some variations, S212 includes retrieving all file names associated with the provided authentication credentials (and optionally the user agent credentials). In some variations, S212 includes retrieving selected ones of the file names (as determined based on user selection received via the user interface 124). In some variations, S212 includes retrieving all metadata associated with the provided authentication credentials (and optionally the user agent credentials). In some variations, S212 includes retrieving selected ones of the metadata (as determined based on user selection received via the user interface 124). In some variations, S212 is performed by the encryption module 128.

S213 functions to decrypt the encrypted data (e.g., 122) (CM) by using an encryption key provided by the recovery agent system (at S211) as a response to a recovery request provided to the recovery agent system by the user agent. In some variations, S213 is performed by the user agent that secures the sensitive data. In some variations, S213 is performed by a user agent that is different from the user agent that secures the sensitive data. In some variations, S213 is performed by the user device that secures the sensitive data. In some variations, S213 is performed by a user device that is different from the user device that secures the sensitive data. In some variations, S213 is performed by an encryption module (e.g., 128).

In some variations, at S212, the user agent retrieves a nonce (CN) associated with the secured sensitive data (CM), and S213 includes decrypting the encrypted data (e.g., 122) by using the encryption key and the retrieved nonce (CN). For example, using the NaCL Cryptography Library, the encrypted data (CM) is decrypted (to produce the sensitive data M) by calling secretbox::open(msg=CM, nonce=CN, k="encryption key received at S211"). In some variations, the sensitive data can be encrypted by using any suitable type of decryption process.

In some variations, the nonce (CN) is generated by the user agent (or another user agent) at S232. In some variations, the user agent retrieves the nonce from the storage provider system (e.g., from a file that includes the sensitive data, from metadata, from a separate file, etc.). In some variations, at S211, the user agent retrieves the nonce (CN) from the user device that executes the user agent. In some variations, at S211, the user agent retrieves the nonce (CN) from the recovery agent system.

S250 functions to use the sensitive data (e.g., perform a process using the sensitive data). In some variations, S250 is performed by the user agent that performs S210. In some variations, S250 is performed by the user agent that performs S220. In some variations, S250 is performed by the user agent that performs S230. In some variations, S250 is performed by a user agent that is different from the user agent that performs S210. In some variations, S250 is performed by a user agent that is different from the user agent that performs S220. In some variations, S250 is performed by a user agent that is different from the user agent that performs S230.

S250 can include S251, which includes restoring a blockchain wallet by using the sensitive data. In some variations, the sensitive data includes a mnemonic of a hierarchical deterministic (HD) blockchain wallet application, and S220 includes using the HD blockchain wallet application at the user device to generate the mnemonic. In some variations, S251 includes using the HD blockchain wallet application to generate a blockchain private key from the mnemonic (e.g., a private key of a blockchain public-private key pair for a blockchain network). In some implementations, the HD wallet application is included in the user agent. In some implementations, the HD wallet application is executed by the user device that also executes the user agent. In some implementations, the mnemonic is a random 12-word recovery passphrase based on BIP39, and the user agent stores the mnemonic in a volatile memory of the user device that executes the user agent. In some implementations, during a power-down process of the user device, the mnemonic is removed from the volatile memory.

S250 can include S252, which includes signing an unsigned blockchain transaction by using the recovered sensitive data. In a first variation, the sensitive data recovered at S210 is a private key (e.g., of a blockchain public-private key pair for a blockchain network), and S252 includes signing the transaction by using the private key. In a second variation, the sensitive data recovered at S210 is the mnemonic recovered at S252, and S252 includes signing the transaction by using the private key generated at S251 from the recovered mnemonic. In some variations, the private key used at S252 is a private key associated with a sending blockchain address of the blockchain transaction.

S252 can include generating the unsigned transaction.

S252 can include transmitting the signed blockchain transaction to a blockchain node (e.g., via one of a public network, such as the Internet, and a private network).

S220 functions to generate the sensitive data with a user agent. In some variations, the sensitive data generator 127 performs S220. Sensitive data can include, for example, passwords, banking information, healthcare information, secrets, blockchain private keys, cryptocurrency private keys, cryptocurrency wallet mnemonics, and the like. In some variations, S220 includes using an HD blockchain wallet application at the user device to generate a mnemonic (as described herein). In some variations, S220 includes generating a private key.

S220 can optionally include storing the generated sensitive data in a non-volatile storage medium of the user device that executes the user agent. S220 can optionally include storing the generated sensitive data in an external non-volatile storage medium (e.g., a flash drive, a storage medium of an air-gapped computer, a storage medium of a hardware wallet, etc.) that is external to the user device that executes the user agent.

S220 can optionally include: generating at least one public key (or master public key, e.g., xpubkey) from a mnemonic generated at S220. S220 can optionally include: providing at least one generated public key to a blockchain system. In a first implementation, the blockchain system is a client application running on the same device as the user agent. In a second implementation, the blockchain system is a remote system, and the user agent provides the generated public keys to the blockchain system via a network (e.g., a public network, such as the internet, a private network, etc.).

S240 functions to delete secured data. In some variations, S240 is performed by a user agent that performs one or more of S210, S220, S230 and S250. S240 can include deleting the generated sensitive data from a volatile or non-volatile storage medium of the user device that executes the user agent. S240 can additionally, or alternatively, include deleting at least one of: encryption keys received at S230 and/or S210; sensitive data nonces (CN) generated, accessed or received received at S230 and/or S210; encryption key IDs keys received at S230 and/or S210; data downloaded from the storage provider system (e.g., CM, CN) at S210; wallet data generated at S251; and signed transactions signed at S252. In some variations, S240 is performed after the sensitive data is secured (e.g., at S230). In some variations, S240 is performed after securing the sensitive data at S230. In some variations, S240 is performed after encrypting the sensitive data at S332. In some variations, S240 is performed after storing the encrypted sensitive data at S233. In some variations, S240 is performed after recovering the sensitive data at S210. S240 can include closing an iframe that includes the user agent. Alternatively or additionally, S240 can include closing an iframe included in the user agent.

S240 can include: with the user agent, providing a delete backup request to the recovery agent system. In some implementations, the delete backup request identifies an encryption key ID (or hash of the encryption key ID), and the recovery agent system processes the backup delete request by performing at least one of: deleting the encryption key ID, deleting the encryption key associated with the encryption key ID, deleting a nonce associated with the encryption key. In some implementations, the delete backup request identifies a recovery account, and the recovery agent system processes the backup delete request by performing at least one of: deleting the recovery account, deleting the encryption key associated with the recovery account, deleting a nonce associated with the recovery account.

S240 can include: at last one of a verification system and the recovery agent system providing an out-of-band verification request to the user agent during processing of the delete backup request (by the recovery agent system), and the recovery agent system completing processing of the delete backup request responsive to receiving a valid verification response from the user agent.

S240 can include: with the user agent, providing an out-of-band verification response in connection with the delete backup request to the recovery agent system.

S240 can include: the user agent sending a request to the storage provider system to delete the encrypted sensitive data (e.g., 122).

In some variations, the user agent (e.g., 120) stores at least one of the following at the user device (e.g., 121) in at least one of a volatile storage medium and a non-volatile storage medium included in the user device: encryption keys received at S230 and/or S210; sensitive data nonces (CN) generated, accessed or received at S230 and/or S210; encryption key IDs keys received at S230 and/or S210; data downloaded from the storage provider system (e.g., CM, CN) at S210; wallet data generated at S251; and signed transactions signed at S252.

S230 functions to secure the sensitive data (e.g., 123) (e.g., by generating a backup bundle) by using a user agent (e.g., the user agent that performs S210, or a different user agent used for a recovery process). In some variations, the secured sensitive data (e.g., 122) is a string that represents the sensitive data in an encrypted format (e.g., an AES 256 data encryption format). In some variations, the secured sensitive data (e.g., 122) is a an encrypted (e.g., AES 256) JSON blob that represents the sensitive data.

S230 can include one or more of: receiving an encryption key at the user agent from a remote recovery agent system (e.g., no) S231; encrypting the sensitive data by using the received encryption key S232; and storing the encrypted sensitive data at a storage provider system (e.g., 130) S233. In a first variation, the encryption key is a symmetric key. In a second variation, the encryption key is a public key of a public-private key pair (and the encryption key returned at S211 is the private key of the key pair). In some variations, the encryption module 128 performs at least a portion of one or more of S231, 232, and 233.

S231 can include: with the user agent, establishing a communication session between the user agent 120 and the recovery agent system 110 (e.g., via the agent interface 111) by using the recovery agent authentication credentials 125 (and optionally multi-factor authentication information). S231 can optionally include, the user device 120 receiving a session cookie (auth token) from the recovery agent system no and storing the session cookie for use in subsequent communications with the recovery agent system.

S231 can include the user agent providing a backup request (encryption key request) (e.g., POST to/encryption_keys/StorageProviderDescription) to the recovery agent system, and receiving at least one encryption key from the recovery agent system as a response to the request. In some variations, the backup request includes a description (or identifier) for the storage provider system (e.g., 130) to be used to store the encrypted sensitive data. In some variations, the user agent also receives an encryption key ID for each encryption key returned in the response to the backup request. In some variations, each response to a backup recovery request includes a different encryption key. In some variations, the number of keys generated for each recovery account is fixed, and after a predetermined number of backup requests provided by the user agent, the response to the recovery request is an empty response that does not include an encryption key. In some variations, each response to a backup recovery request for a same recovery account includes a same encryption key. In some variations, each response to a backup recovery request for a same recovery account ordinarily includes a same encryption key, unless the backup request includes a parameter that instructs the recovery agent system to generate a new encryption key.

S231 can include: with the recovery agent system (e.g., 110), generating a new encryption key (e.g. 116) by using an encryption key generator (e.g., 113). In a first implementation the recovery agent system generates the new encryption key during account generation for a recovery account associated with the recovery agent authentication credentials (e.g., 125) used by the user agent. In a second implementation, the recovery agent system generates the new encryption key during processing of a corresponding backup request received from the user agent. In a third implementation, the recovery agent system generates the new encryption key responsive to a determination that sensitive data has been created for the recovery account associated with the recovery agent authentication credentials (e.g., 125) used by the user agent. In an example, the user agent sends the recovery agent system a notification indicating that sensitive data has been created for the recovery account.

In some variations, at least one new encryption key generated at S231 is a single-use encryption key that is deleted by the recovery agent system after each recovery operation (e.g., at S210). In other words, in such variations, each recovery operation S210 can be performed exactly once for the secured sensitive data, such that if S210 is performed again, the sensitive data cannot be restored even if it is still stored at the storage provider system 130.

In some variations, at least one new encryption key generated at S231 is a multi-use encryption key that is persisted by the recovery agent system after each recovery operation (e.g., at S210). In other words, in such variations, each recovery operation S210 can be performed multiple times for the secured sensitive data, such that if S210 is performed again, the sensitive data can still be restored if it is still stored at the storage provider system 130.

In some variations, S231 includes the recovery agent system encrypting each generated encryption key (e.g., 116), thereby creating a ciphertext version (C) of the key, by using the encryption module 112. In some implementations, the recovery agent system encrypts each key for a recovery account by using a master encryption key (e.g., 117) used by the recovery agent system for encrypting keys for all recovery accounts. In some implementations, the recovery agent system encrypts each key for a recovery account by using a master encryption key (e.g., 117) used by the recovery agent system for encrypting keys for the recovery account (whereas different master keys are used to encrypt keys for other recovery accounts). Additionally, or alternatively, at least one encryption key generated by the recovery agent is encrypted by using the master key and a nonce (N) generated for the generated encryption key (e.g., by the encryption module 112). In some implementations, the encryption key module 112 is the NaCL Cryptography Library, and the encryption key module 112 encrypts the encryption key generated by the generator 113 by calling secretbox::seal (msg="key generated by generator 113", nonce=N, k="system key 117"), which generates a ciphertext version (C) of the key generated by the generator 113. In some implementations, the key can be encrypted by using any suitable type of encryption process.

In some implementations, the nonce (N) is randomly generated. In some implementations, the nonce is generated by incrementing a previously generated nonce.

In some implementations, the recovery agent system stores each generated encryption key in association with at least one of an account identifier (of an account managed by the account database 114), and an encryption key ID (e.g., in the encryption key storage 115). In some implementations, the recovery agent system generates an encryption key ID for each generated encryption key. In some implementations, the encryption key ID for a generated key is an identifier that can be used to retrieve at least one of the following from the encryption key storage 115: ciphertext version of the key (C); a nonce (N) generated for the key; cleartext version of the key; time of generation of the encryption key; user account associated with the encryption key; storage provider description for data to be encrypted by using the encryption key; description of the data to be encrypted by using the encryption key, and the like.

In some variations, each encryption key ID is generated by hashing (e.g., by using at least one of SHA256, HMAC-SHA256) at least a portion of data retrievable by using the encryption key ID. In some variations, each encryption key ID is generated by using a random number generator. In some variations, each encryption key ID is generated by incrementing a last used encryption key ID. In some variations, each encryption key ID is generated by hashing a current time stamp.

In some variations, S232 is performed by the encryption module 128 of the user agent.

S232 can include: with the user agent, generating a sensitive data nonce (CN) to be used to encrypt the sensitive data (thereby generating the encrypted data 122, "CM"). In some variations, the encryption module 128 generates the sensitive data nonce (CN). For example, using the NaCL Cryptography Library, the sensitive data can be encrypted (CM) by calling secretbox::seal (msg=M, nonce=CN, k="encryption key"), wherein M is the sensitive data, CN is the sensitive data nonce, and "encryption key" is the encryption key received at S231; M can be recovered by calling secretbox::open(msg=CM, nonce=CN, k="encryption key"). In some variations, the sensitive data can be encrypted by using any suitable type of encryption process. Without the sensitive data nonce (CN), the recovery agent system cannot decrypt CM, even it if has the encryption key. In some variations, the sensitive data can be encrypted by using any suitable type of encryption process. In some implementations, the sensitive data nonce (CN) is randomly generated. In some implementations, the sensitive data nonce (CN) is generated by incrementing a previously generated sensitive data nonce. In some implementations, the user agent secures the sensitive data nonce (CN) by preventing the recovery agent system from accessing the sensitive data nonce. In some implementations, the user agent stores the sensitive data nonce CN in a non-volatile storage medium included in (or coupled to via a bus) the user device that executes the user application. In some implementations, the user agent stores the sensitive data nonce CN at the storage provider system in association with the encrypted sensitive data (e.g., in a same file, a same storage location, a same file name, a same database, etc.) (S233). In some implementations, the user agent stores the sensitive data nonce CN at the storage provider system in association with the same encryption key ID associated with the encrypted sensitive data (e.g., 122) (S233).

S233 can include: with the user agent, establishing a communication session between the user agent 120 and the storage provider system 130 (e.g., via the client interface 131) by using the storage provider authentication credentials 126 (and optionally multi-factor authentication information). S233 can optionally include, the user device 120 receiving a session cookie (auth token) from the storage provider system 130 and storing the session cookie for use in subsequent communications with the storage provider system. S233 can include: with a storage provider client included in the user agent (e.g., as a nested iframe, optionally having a content security policy scoped to the storage client interface 131), establishing a communication session between the storage provider client and the storage provider system 130 (e.g., via the client interface 131) by using the storage provider authentication credentials 126 (and optionally multi-factor authentication information). S233 can optionally include, the user device 120 receiving a session cookie (auth token) from the storage provider system 130 and storing the session cookie for use in subsequent communications with the storage provider system.

S233 can include generating a file that includes the generated encrypted data (e.g., 122, CM) (and optionally the sensitive data nonce CN). S233 can include generating a first file that includes the generated encrypted data (e.g., 122, CM) and a second file that includes the sensitive data nonce CN. S233 can include generating a filename for each generated file based on a template. Alternatively or additionally, S233 can include generating a filename for each generated file based on at least one encryption key ID received form the recovery agent system at S231. In a first implementation, generating a filename for each generated file based on at least one encryption key ID includes generating a filename that includes the encryption key ID. In a second implementation, generating a filename for each generated file based on at least one encryption key ID includes generating hash of the encryption key ID and generating a filename that includes the generated hash of the encryption key ID. In an example, each file name is formed as follows: "seed_<H>.json", wherein <H> is the SHA256 hash of the encryption key ID. In other examples, a filename that includes the generated hash of the encryption key ID can be generated in accordance with any suitable type of format and/or template.

S233 can include, after establishing the communication session with the storage provider system and generating at least one file that includes the generated encrypted data (e.g., 122, CM) (and optionally the sensitive data nonce CN), storing each generated file at the storage provider system (e.g., as shown in FIG. 5A).

Alternatively or additionally, S233 can include after establishing the communication session with the storage provider system, storing the generated encrypted data (e.g., 122, CM) (and optionally the sensitive data nonce CN) as metadata at the storage provider system (as shown in FIG. 5B).

Storing the generated encrypted data (e.g., 122, CM) (and optionally the sensitive data nonce CN) at the storage provider system can include: storing in a predetermined folder associated with at least one of the recovery processes, the user agent, and the recovery agent.

Storing the generated encrypted data (e.g., 122, CM) (and optionally the sensitive data nonce CN) at the storage provider system can include: storing in an AppData folder secured with authentication credentials associated with the user agent.

Storing the generated encrypted data (e.g., 122, CM) (and optionally the sensitive data nonce CN) at the storage provider system can include: securing the stored encrypted data (e.g., 122, CM) (and optionally the sensitive data nonce CN) at the storage provider system with authentication credentials associated with the user agent.

Storing the generated encrypted data (e.g., 122, CM) (and optionally the sensitive data nonce CN) at the storage provider system can include: securing the stored encrypted data (e.g., 122, CM) (and optionally the sensitive data nonce CN) at the storage provider system with the storage provider authentication credentials 126.

In some variations, at S233, the user agent (e.g., 120) stores at the user device (e.g., 121) in at least one of a volatile storage medium and a non-volatile storage medium included in the user device: an identifier of the encrypted sensitive data (e.g., 122) stored at the storage provider system; and optionally a sensitive data nonce (CN) associated with the encrypted sensitive data. In some implementations, the identifier is a human readable description. In some implementations, the identifier is a hash of the sensitive data. In some implementations, the identifier is a randomly generated identifier. In some implementations, the identifier is a hash of an encryption key ID associated with the encrypted sensitive data.

Sensitive data can be used as a form of authentication during establishment of a communication session between the user agent and the recovery agent system, or a blockchain system in communication with the recovery agent system. In some embodiments, in a case where multi-factor authentication is unavailable (e.g., not working or not configured), the cleartext version of the sensitive data can be used to authentication the session. In some embodiments, during establishment of a communication session between the user agent 120 and the recovery agent system 110, the user agent provides the recovery agent authentication credentials 125, and recovers the sensitive data as described herein for S210. The user agent compares the recovered sensitive data with user-input received via the user interface 124. In response to a determination that the received user-input matches the recovered sensitive data, the user agent provides a validation response to the recovery agent system validating that the user-input received via the user interface 124 matches the secured sensitive data. In this manner, the recovery agent system can be assured that a user attempting to log in to the recovery agent system is authorized, since a user that can provide the clear-text sensitive data is likely to be the user associated with the recovery agent authentication credentials 125.

In some embodiments, a non-transitory processor-readable storage medium includes processor-readable instructions, that when executed by at least one processor, control the processor to perform at least one process of the method 200.

In some variations, the non-transitory processor-readable storage medium is one of (or a combination of two or more of) a hard drive, a flash drive, a DVD-ROM, a CD-ROM, an optical disk, a floppy disk, a flash storage, a solid state drive, a ROM, an EEPROM, an electronic circuit, and a semiconductor memory device. In some variations, the non-transitory processor-readable storage medium is included in the recovery agent system. In some variations, the non-transitory processor-readable storage medium is included in an application store system (e.g., iTunes, Google Play, etc.). In some variations, the non-transitory processor-readable storage medium is included in a blockchain wallet application server system. In some variations, the processor-readable instructions stored on the non-transitory processor-readable storage medium are instructions of the user agent. In some variations, the non-transitory processor-readable storage medium is included in a system accessible by a user device (e.g., downloadable by the user device) via a network (e.g., a public network, such as the Internet, a private network, etc.). Some embodiments include transmitting the processor-readable instructions stored on the non-transitory processor-readable storage medium from a system that includes the non-transitory processor-readable storage medium to a user device (remote from the system that stores the non-transitory processor-readable storage medium).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for managing sensitive data by a user agent application executed by a user device, the method comprising:
   generating, by the user device, the sensitive data;
   receiving, by the user device, a new encryption key generated by and received from a remote recovery agent system, wherein the new encryption key is stored at the remote recovery agent system;
   encrypting, by the user device and by using the received encryption key generated by the remote recovery agent system, the sensitive data;
   transmitting, by the user device, the encrypted sensitive data for storage at a storage provider system, wherein the storage provider system is remote from the user device and isolated from the remote recovery agent system, wherein storing the encrypted sensitive data at the storage provider system comprises:
      receiving, by the user device, an encryption key identifier for the new encryption key from the remote recovery agent system; and
      in response to receiving the encryption key identifier for the new encryption key from the remote recovery agent system:
         generating, by the user device, a file name based on the received encryption key identifier, and
         transmitting, by the user device, the encrypted sensitive data for storage at the storage provider system in a file that has the generated file name; and
   recovering, by the user device, the sensitive data, wherein recovering the sensitive data comprises:
      retrieving, by the user device and from the storage provider system by using storage provider system authentication credentials, the encrypted sensitive data;
      retrieving, by the user device, from the remote recovery agent system, and by using recovery agent system authentication credentials, the stored encryption key; and
      decrypting, by the user device, the encrypted sensitive data using the retrieved encryption key.

2. The method of claim 1, further comprising:
   generating, by the user device, an unsigned blockchain transaction;
   signing, by the user device and by using the recovered sensitive data, the unsigned blockchain transaction; and
   transmitting, by the user device, the signed blockchain transaction to a blockchain node system.

3. The method of claim 1, wherein the sensitive data includes a blockchain private key of a blockchain public-private key pair for a blockchain network.

4. The method of claim 2,
   wherein the sensitive data includes a mnemonic, and
   wherein signing the unsigned blockchain transaction comprises: generating a blockchain private key from the mnemonic, and signing the unsigned blockchain transaction with the generated private key.

5. The method of claim 4, wherein the mnemonic is a random 12-word recovery passphrase based on BIP39, and wherein the user agent application stores the mnemonic in a volatile memory of the user device.

6. The method of claim 1,
   wherein retrieving the encrypted sensitive data from the storage provider system by using storage provider system authentication credentials comprises:
      receiving storage provider system authentication credentials and logging in to the storage provider system by using the storage provider system authentication credentials; and
   wherein retrieving the stored encryption key from the remote recovery agent system by using recovery agent system authentication credentials comprises:
      logging into to the remote recovery agent system by using the remote recovery agent system authentication credentials.

7. The method of claim 6, wherein receiving the new encryption key comprises:
   with the user agent application:
      logging into to the remote recovery agent system by using the remote recovery agent system authentication credentials;
      sending a new encryption key request to the remote recovery agent system; and
      receiving the new encryption key from the remote recovery agent system, wherein the new encryption key is generated responsive to the new encryption key request and stored at the remote recovery agent system, wherein the remote recovery agent system comprises a recovery agent for a cryptocurrency management system.

8. The method of claim 6, wherein the new encryption key is stored in association with the encryption key identifier.

9. The method of claim 6, wherein during recovery of the encrypted sensitive data, retrieving the stored encryption key comprises:
  logging into to the remote recovery agent system by using the remote recovery agent system authentication credentials and providing a recovery request to the remote recovery agent system, the recovery request identifying information retrieved from the storage provider system by the user agent application.

10. The method of claim 6, wherein during recovery of the encrypted sensitive data, retrieving the stored encryption key comprises:
  logging into to the remote recovery agent system by using the remote recovery agent system authentication credentials and providing a recovery request to the remote recovery agent system, the recovery request identifying the encryption key identifier.

11. The method of claim 6, wherein storing the encrypted sensitive data at the storage provider system further comprises:
  receiving storage provider system authentication credentials and logging in to the storage provider system by using the storage provider system authentication credentials.

12. The method of claim 6, wherein during recovery of the encrypted sensitive data, retrieving the stored encryption key comprises:
  logging into to the remote recovery agent system by using the remote recovery agent system authentication credentials and providing a recovery request to the remote recovery agent system; and
  receiving, from the remote recovery agent system, the encryption key, wherein the encryption key is received in response to confirmation of the recovery request using multi-factor authentication.

13. The method of claim 11,
  wherein the user agent application receives the encryption key identifier for the new encryption key from the remote recovery agent system;
  wherein during recovery of the encrypted sensitive data, retrieving the stored encryption key comprises:
    logging in, by the user device and by using the remote recovery agent system authentication credentials, to the remote recovery agent system;
    logging in, by the user device and by using the storage provider system authentication credentials and retrieving the file that has the generated file name to the storage provider system;
    extracting, by the user device and from the generated file name of the retrieved file, the encryption key identifier;
    providing, by the user device and to the remote recovery agent system, a recovery request that identifies the encryption key identifier; and
    receiving, by the user device and from the remote recovery agent system, the encryption key, wherein the encryption key is accessed using the encryption key identifier identified in the recovery request.

14. The method of claim 13, wherein accessing the encryption key by using the encryption key identifier identified in the recovery request comprises:
  determining whether the encryption key identifier is associated with a recovery agent account associated with the remote recovery agent system authentication credentials; and
  accessing the encryption key responsive to a determination that the encryption key identifier is associated with the recovery agent account associated with the remote recovery agent system authentication credentials.

15. The method of claim 11,
  wherein generating the encryption key comprises: generating a nonce;
  wherein storing the encryption key comprises: encrypting the encryption key by using the nonce and a symmetric key; and
  wherein the encryption key identifier identifies the encrypted encryption key and the nonce.

16. The method of claim 6, wherein storing the encrypted sensitive data at the storage provider system comprises:
  storing the encrypted sensitive data in a storage location that is secured by authentication credentials of the user agent application.

17. The method of claim 6, wherein the encrypted sensitive data is configured for recovery by a second user device.

18. One or more non-transitory computer-readable media storing a user agent application that, when executed by a user device comprising at least one processor, a communication interface, and memory, cause the user device to:
  generate, by the user device, sensitive data,
  encrypt, by the user device and by using a symmetric encryption key, the sensitive data, wherein the symmetric encryption key is generated by, received from, and stored at a remote recovery agent system,
  transmit, by the user device, the encrypted sensitive data for storage at a storage provider system, wherein the storage provider system is remote from the user device and isolated from the remote recovery agent system, wherein storing the encrypted sensitive data at the storage provider system comprises:
    receiving, by the user device, an encryption key identifier for the symmetric encryption key from the remote recovery agent system; and
    in response to receiving the encryption key identifier for the symmetric encryption key from the remote recovery agent system:
      generating, by the user device, a file name from the received encryption key identifier, and
      transmitting, by the user device, the encrypted sensitive data for storage at the storage provider system in a file that has the generated file name, and
  recover, by the user device, the encrypted sensitive data by:
    retrieving, by the user device, from the storage provider system, and by logging into the storage provider system using storage provider system authentication credentials, the encrypted sensitive data;
    retrieving, by the user device, from the remote recovery agent system, and by logging into the remote recovery agent system using remote recovery agent system authentication credentials, the stored encryption key; and
    decrypting, by the user device, the encrypted sensitive data using the retrieved encryption key.

19. The one or more non-transitory computer-readable media of claim 18, wherein the user device receives the user agent application from a blockchain wallet application server.

20. The one or more non-transitory computer-readable media of claim 19, wherein the user agent application, when executed by the user device, further causes the user device to
  transmit, by the user device and to the remote recovery agent system, an encryption key request received from the user agent application, wherein the encryption key request causes the remote recovery agent system to:
generate the encryption key,
store the encryption key, and
transmit the encryption key to the user agent application; and transmit, by the user device and to the remote recovery agent system, a recovery request received from the user agent application, wherein the recovery request causes the remote recovery agent system to transmit the stored encryption key to the user agent application.

\* \* \* \* \*